(No Model.)
J. H. PIPER.
NUT LOCK.
No. 380,926. Patented Apr. 10, 1888.
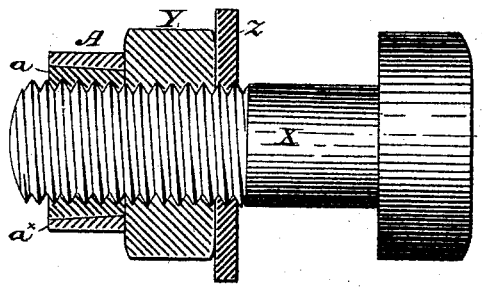
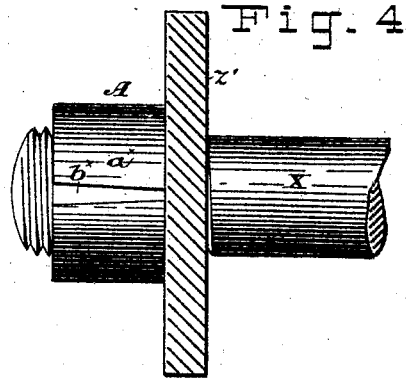
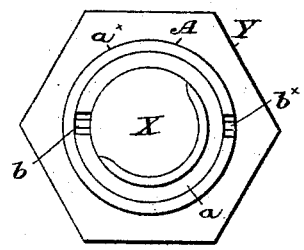
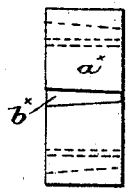
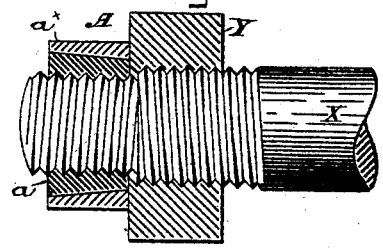
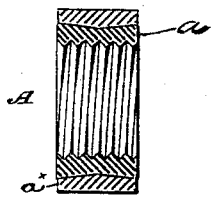
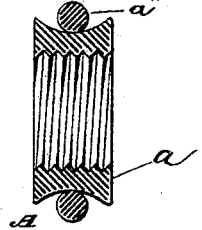
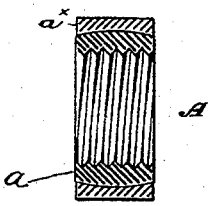
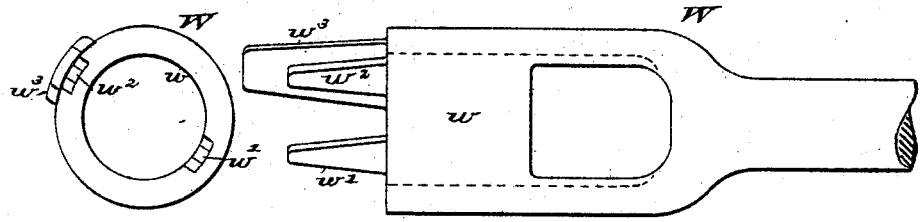
WITNESSES:
INVENTOR:
John H. Piper
By Henry Connett,
Attorney.

UNITED STATES PATENT OFFICE.

JOHN H. PIPER, OF BROOKLYN, NEW YORK.

NUT-LOCK.

SPECIFICATION forming part of Letters Patent No. 380,926, dated April 10, 1888.

Application filed January 28, 1888. Serial No. 262,278. (No model.)

*To all whom it may concern:*

Be it known that I, JOHN H. PIPER, a citizen of the United States, and a resident of Brooklyn, Kings county, New York, have invented certain new and useful Improvements in Nut-Locks, of which the following is a specification.

My invention relates to that class of devices designed to prevent the accidental unscrewing of a nut where the latter and its bolt are subjected to jolting and jarring shocks or vibrations, as in bolts employed in railway-joints.

My device may be employed in connection with an ordinary nut as a lock therefor, or alone, as a self-locking nut; and the object of my invention is to produce a simple and inexpensive device that will accomplish the object sought.

My invention will be hereinafter fully described, and its novel features carefully defined in the claims.

In the drawings, which serve to illustrate my invention, Figure 1 is a side elevation of a bolt provided with a nut and my improved locking nut or device. The nut and locking device are represented in section. Fig. 2 is an end view of the bolt, the nut, and the locking nut or device. Fig. 3 is a side elevation of the locking nut or device detached. Fig. 4 is a side elevation of a bolt, showing my improved locking device employed independently as a nut. Fig. 5 is a view similar to Fig. 1, showing another mode of employing my locking-nut. In this view the bolt is shown with two screw-threaded portions, one provided with a right-hand and the other with a left-hand screw-thread. Figs. 6, 7, and 8 are sectional views illustrating different forms that may be given to the two parts or members of the locking-nut. Fig. 9 is a side view, and Fig. 10 an end view, of the wrench I usually employ for applying my locking-nut to the bolt and setting it up.

Referring first to Figs. 1, 2, and 3, which illustrate the usual mode of constructing and employing my locking nut or device, X represents an ordinary bolt, Y an ordinary nut screwed thereon, and Z an ordinary washer. These elements or parts are those ordinarily employed in bolting together structures.

To prevent the nut Y from jarring loose on the bolt and unscrewing, I employ my locking-nut, represented as a whole by A. In its simplest form this nut comprises two elements or parts, $a$ $a^\times$, which will usually be of steel. Each of these elements is in the form of an open or cut tubular ring, the inner ring, $a$, having a female screw cut in it to fit the screw-thread on the bolt, and the outer ring, $a^\times$, surrounding or embracing the inner ring. The slits $b$ and $b^\times$, respectively, in the two rings are arranged oppositely, (see Fig. 2,) in order that the body of one ring may span the slit or opening in the other, and thus form, taken together, a practically continuous or uncut nut. Thus the outer member or ring, $a^\times$, re-enforces the inner member, $a$, but leaves it free to be expanded.

The screw-threaded bore in the inner ring, $a$, is somewhat less in diameter than the screw-threaded portion of the bolt on which it is to be screwed, and in order to apply the locking-nut to the bolt it must be slightly expanded. Then, when allowed to contract by reason of its own elasticity, the said nut will clamp the bolt very firmly, and, indeed, so tightly as to avoid any risk of being loosened or unscrewed by jars or jolts.

In applying my locking-nut to a bolt I prefer to employ a special expanding-wrench, somewhat like that illustrated in Figs. 9 and 10, but of course any means may be employed for this purpose. I will briefly describe this wrench and the manner of using it.

I usually and preferably make the slits $b$ and $b^\times$ in the respective members of the locking-nut of a wedge shape, as clearly illustrated in Figs. 2, 3, and 4, and I provide the wrench W with a tubular or hollow body, $w$, and two projecting wedge-like expanding prongs, $w'$ and $w^2$, so arranged that when applied to the face of the locking-nut A they will register with and enter, respectively, the wider ends of slits $b$ and $b^\times$. For convenience in applying the wrench, I usually provide it with a spur, $w^3$, which projects a little beyond the prongs $w'$ $w^2$, and serves as a guide, being placed against the side of the locking-nut A in a position to cause the prongs to coincide with and enter their respective slits. When the prongs have been made to enter, they are driven in by a blow on the end of the wrench, and this spreads or expands the locking-nut sufficiently to allow it to be screwed easily onto the bolt and up snugly against the face of the nut Y. The prongs of the wrench are now withdrawn and the locking-nut allowed to contract and tightly embrace the bolt. The prongs $w'$ $w^2$ should be so proportioned and beveled that when driven "home," or as far as they can be driven, they will produce the proper expansion of the nut, and the slits $b$ $b^\times$ tapered to correspond with the taper of the expanding prongs.

Fig. 4 shows the locking-nut A employed without an ordinary nut, Y. In this view $Z'$ represents a plate of any kind, as a fish-plate, for example.

Fig. 5 shows the bolt X provided with a right-hand screw to receive the nut Y, and a left-hand screw on the reduced extremity of the bolt to receive the locking-nut A.

To keep the outer ring or member, $a^\times$, of the locking-nut in place on the inner member, either of the several devices shown may be employed. For example, in Figs. 1 to 5 the rings are shown as tapered in opposite directions, ring $a$ being tapered exteriorly and ring $a^\times$ interiorly. In Fig. 6 the ring $a$ has a V-groove in it exteriorly, and the ring $a^\times$ is constructed to fit it. In Fig. 7 the outer ring or member, $a^\times$, is a simple ring of circular cross-section, which engages a groove in the inner ring or member, $a$.

In Fig. 8 the inner ring, $a$, is convex exteriorly, and the outer ring or member is constructed to fit it. In all of these forms both rings will be cut or slitted and have the slits arranged oppositely, or substantially so, as seen in Fig. 2.

It will be seen that by expanding both rings simultaneously no difficulty will be experienced, but great resistance will be offered by the outer ring to the expansion of the inner ring alone. In this lies the efficiency of my locking-nut as distinguished from simple split nuts.

Having thus described my invention, I claim—

1. A locking-nut comprising an inner ring-like member, as $a$, slitted and provided with a female screw, and an outer ring-like slitted member, as $a^\times$, embracing said inner member, substantially as set forth.

2. A locking-nut comprising an inner ring-like member, as $a$, having a longitudinal tapered slit, $b$, and a female screw, and an outer ring-like member, as $a^\times$, embracing said inner member, and having a longitudinal tapered slit, $b^\times$, said slits being oppositely arranged, as described.

3. A locking-nut comprising two slitted or open ring-like members, one embracing the other, and the slits or openings oppositely arranged, the inner member having a female screw and a tapered form exteriorly, and the outer member having a tapered form internally, as set forth.

In witness whereof I have hereunto signed my name in the presence of two subscribing witnesses.

JOHN H. PIPER.

Witnesses:
HENRY CONNETT,
JOHN D. CAPLINGER.